J. M. DODGE.
CHAIN LINK.
APPLICATION FILED MAY 16, 1910.
999,156.
Patented July 25, 1911.
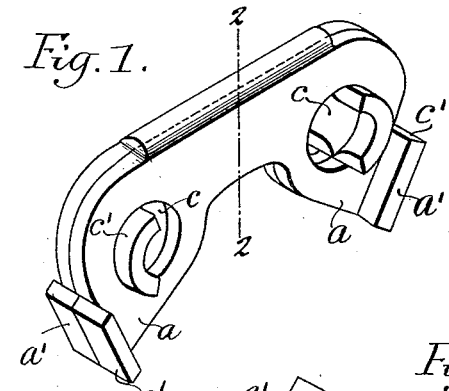
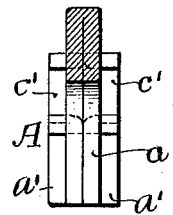
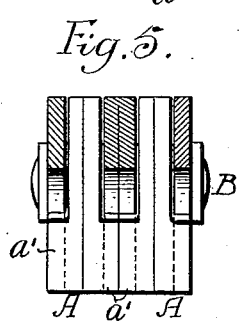
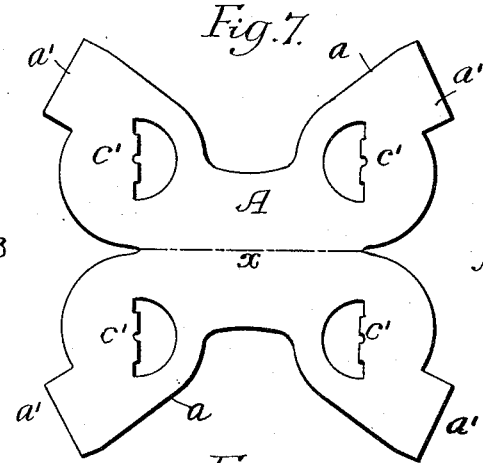
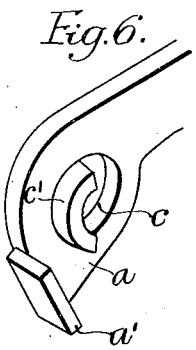
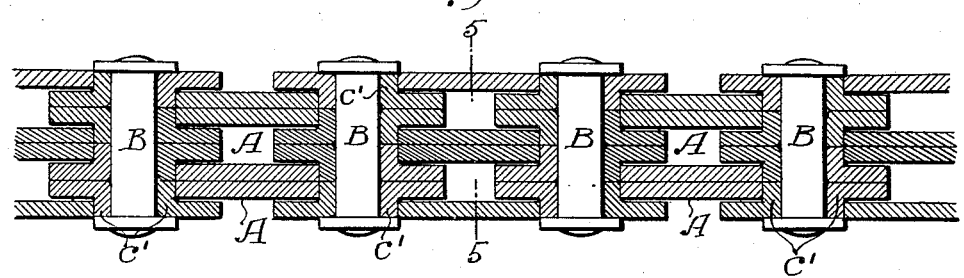
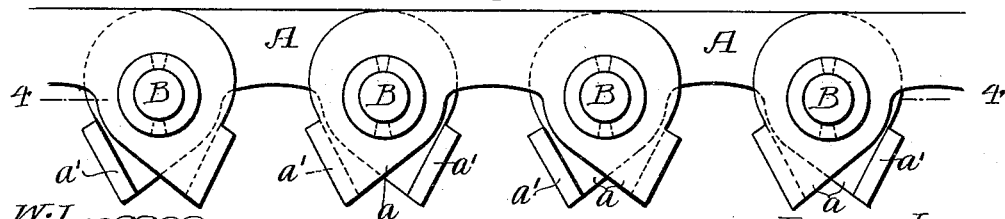
Witnesses:
Inventor
James M. Dodge.
by his Attorneys,

UNITED STATES PATENT OFFICE.

JAMES M. DODGE, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINK.

999,156. Specification of Letters Patent. Patented July 25, 1911.

Continuation of application Serial No. 532,085, filed December 8, 1909. This application filed May 16, 1910. Serial No. 561,650.

*To all whom it may concern:*

Be it known that I, JAMES M. DODGE, a citizen of the United States, residing in Philadelphia, Pennsylvania, have invented certain Improvements in Chain-Links, of which the following is a specification.

My invention relates to certain improvements in drive chains in which the links are provided with teeth which engage the teeth of sprocket wheels. In this type of chain the link elements are flat and the width of the chain will vary according to the number of link elements arranged side by side.

The object of my invention is to make a pair of link elements from a single blank.

This application is a continuation of the application filed by me on the 8th day of December, 1909, Serial No. 532,085.

In the accompanying drawing:—Figure 1, is a perspective view of my improved chain link element; Fig. 2, is a sectional view on the line 2—2, Fig. 1; Fig. 3, is a side view of a chain made in accordance with my invention; Fig. 4, is a sectional view on the line 4—4, Fig. 3; Fig. 5, is a sectional view on the line 5—5, Fig. 4; Fig. 6, is a view of one of the side link elements; and Fig. 7, is a view of one form of blank from which my improved link is made.

A, A are the links of the chain, one set of links being coupled to the other by a pivot pin B, as clearly illustrated in Figs. 3 and 4. Each chain link has teeth $a$, $a$ which engage the teeth of a sprocket wheel, the working face of each tooth of the chain link is the outside edge.

I form on the working face of each tooth an extended bearing $a'$, as clearly shown in Fig. 1, and this extended bearing is of such a width that it will abut an extended bearing of an adjoining link element so as to form a practically continuous bearing extending from one edge of the chain to the other, as illustrated in Fig. 5. In wide chains the bearing may be discontinued at intervals.

The outside link elements are made of a single thickness, as illustrated in Fig. 6, having only one extended bearing $a'$, but the intermediate links are of double width, as illustrated in Fig. 1, having extended bearings projecting from each side. $c$, $c$ are the pivot pin openings in the link elements and $c'$, $c'$ are the extended bearings projecting laterally from the link at the opening $c$ for the pivot pin B, and these bearings extend from one side of the chain to the other, as illustrated in Fig. 4, so that in this case both the bearings for the pivot pin and the bearings for the sprocket wheels have extended bearing surfaces. I make the intermediate link elements in pairs by first forming a blank and turning up both the projecting portions $c'$ to form extended bearings for the pivot pin, and the portions $a'$ to form the extended bearings for the teeth, after which I bend the blank on the line $x$, Fig. 7, until it assumes the position illustrated in Figs. 1 and 2, making, in fact, two link elements connected at their upper edges. The link elements may be bent from the blank by a number of different methods without departing from the essential features of the invention, which relates to the link element itself.

The above construction is a very satisfactory link element, it can be made of comparatively thin metal, the extended bearings can be readily formed, and when the metal is bent the two sections are brought into perfect alinement, making a very rigid link element.

I do not, in this application, broadly claim a chain link element having laterally extended bearing surfaces at its teeth as this is described and claimed in an application for patent of Harold S. Pierce, filed June 9th, 1909, under Serial Number 501,054.

In a co-pending application filed May 16, 1910, Serial No. 561,649, I have claimed broadly the chain link made of two sections integrally connected, each section having projections on one side. The present application is limited to a chain link consisting of a single piece of metal includng two link elements joined together by an integral connection.

I claim:—

1. A chain link consisting of a single piece of metal having teeth provided with extended bearings, said link including two link elements joined by an integral connection.

2. A chain link consisting of a single piece of metal having teeth provided with extended bearings, said link including two link elements joined by an integral connection, and having openings with laterally extending bearings.

3. A chain link consisting of a single piece of metal having teeth, said link including two link elements joined together by an integral connection and having openings and laterally extended bearings at said openings projecting on opposite sides of the two link elements.

4. A chain link consisting of a single piece of metal having two integrally connected and parallel link elements, said elements having perforations respectively in line with each other and being provided with laterally extended bearings adjacent the perforations, each bearing of one element being in line with a bearing on another element.

In testimony whereof, I have signed my name to this specification, in the presence of two subscribing witnesses.

JAMES M. DODGE.

Witnesses:
HENRY HOWSON,
WM. A. BARR.

Copies of this patent may be obtained for five cents each, by addressing the "Commissioner of Patents, Washington, D. C."